United States Patent [19]

Takada, deceased et al.

[11] E Re. 29,594

[45] Reissued Mar. 28, 1978

[54] AUTOMATIC LOCKING ACCELERATION ACTUATED VEHICLE SAFETY BELT RETRACTOR

[75] Inventors: Takezo Takada, deceased, late of Hikone, Japan, by Juichiro Takada, heir, Tokyo, Japan

[73] Assignee: Takata Kojyo Co., Ltd., Tokyo, Japan

[21] Appl. No.: 715,029

[22] Filed: Aug. 17, 1976

Related U.S. Patent Documents

Reissue of:

[64] Patent No.: 3,897,024
Issued: Jul. 29, 1975
Appl. No.: 441,534
Filed: Feb. 11, 1974

[30] Foreign Application Priority Data

Feb. 12, 1973 Japan ..... 48-16530

[51] Int. Cl.[2] ..... A62B 35/02; B65H 75/48
[52] U.S. Cl. ..... 242/107.4 B
[58] Field of Search ..... 242/107.4 R, 107.4 E; 280/744–747; 297/388

[56] References Cited

U.S. PATENT DOCUMENTS

| | | | |
|---|---|---|---|
| 3,294,446 | 12/1966 | Fontaine | 242/107.4 R X |
| 3,450,368 | 6/1969 | Glavser et al. | 242/107.4 B |
| 3,482,799 | 12/1969 | Wrighton et al. | 242/107.4 B |
| 3,667,698 | 6/1972 | Fisher | 242/107.4 D |
| 3,819,126 | 6/1974 | Stoffel | 242/107.4 B X |
| 3,917,189 | 11/1975 | Bryll | 242/107.4 B |

*Primary Examiner*—Stanley N. Gilreath
*Assistant Examiner*—John M. Jillions
*Attorney, Agent, or Firm*—Wolder, Gross & Yavner

[57] ABSTRACT

An automatic locking vehicle safety belt retractor includes a shaft on which is affixed a belt take up reel having similar first ratchet wheels at its opposite ends. A spring retracted transverse pawl member includes pawl teeth which are rockable with the pawl member into and out of braking engagement with the ratchet wheels and the pawl member is drive coupled to an internally toothed second ratchet wheel rockably mounted on the shaft. A fly wheel is freely rotatable on the shaft within the second ratchet reel and carries a spring retracted second pawl swingable into engagement with the second ratchet wheel and a cam wheel is rotatable with the shaft and engages a cam follower on the second pawl to advance the second pawl upon rotation of the cam wheel relative to the fly wheel. The numbers of teeth on the second ratchet wheel and on each of the first ratchet wheels are equal and the cam and ratchet wheels are so angularly related that when the retractor is braked, the pawls fully engage respective ratchet teeth.

18 Claims, 8 Drawing Figures

AUTOMATIC LOCKING ACCELERATION ACTUATED VEHICLE SAFETY BELT RETRACTOR

Matter enclosed in heavy brackets [ ] appears in the original patent but forms no part of this reissue specification; matter printed in italics indicates the additions made by reissue.

BACKGROUND OF THE INVENTION

The present invention relates generally to improvements in vehicle safety belt retraction devices, and it relates particularly to an improved automatic locking safety belt retractor reel which responds to a belt withdrawal exceeding a predetermined rate.

In order to restrain a vehicle seat occupant against forward motion in the event of a sharp or rapid slowing of the vehicle's forward motion, such as that accompanying a collision or similar occurrence while affording free and unhampered movement to the seat occupant, under normal vehicle conditions it is a common practice to take up the safety belt by a spring biased retractor reel which permits free withdrawal of the safety belt except under rapid vehicle deceleration conditions, under which conditions the reel is automatically locked against belt withdrawal. One type of such reel responds to the belt withdrawal speed exceeding a predetermined rate to lock the reel against further withdrawal. While the reel may respond to any desired belt pull, it should advantageously respond to the pull exceeding 0.3 G. This type of reel which has been heretofore available possesses numerous drawbacks and disadvantages. They are complicated, bulky, expensive devices of limited application, difficult and inconvenient to install, and of little versatility and adaptability.

SUMMARY OF THE INVENTION

It is a principal object of the present invention to provide an improved vehicle safety belt retrator.

Another object of the present invention is to provide an improved automatic locking vehicle safety belt retractor reel.

Still another object of the present invention is to provide a safety belt retraction reel which automatically locks against belt withdrawal when the belt is withdrawn under a pull exceeding a predetermined value.

A further object of the present invention is to provide a device of the above nature, characterized by its high reliability, great compactness, low cost, ease and convenience of installation, and great versatility and adaptability.

In a sense, the present invention contemplates the provision of an automatic locking safety belt retractor comprising a shaft, a take-up reel mounted on and rotatable with the shaft, and spring biased in a belt rewind direction, a safety belt, connected to and retractable by and withdrawable from the reel, a first ratchet wheel rotatable with the reel, a first pawl mounted for movement between positions engaging and disengaging the first ratchet wheel, a second ratchet wheel mounted on and rotatable relative to the shaft, a fly wheel rotatably mounted on the shaft, a second pawl mounted on the fly wheel and movable therewith and movable relative to the fly wheel between positions, engaging and disengaging the second ratchet wheel, and a cam member mounted on and rotatable with the shaft and engagable with the second pawl, whereby rotation of the cam member a predetermined angle in advance of the fly wheel by the rotation of the shaft at a predetermined acceleration in response to a predetermined pull on the belt effects the actuation of the second pawl by the cam member into engagement with the second ratchet wheel to forwardly rock the second ratchet wheel, and actuating means drive coupling the second ratchet wheel and the first pawl whereby forward rocking of the second ratchet wheel advances th first pawl into engagement with the first ratchet wheel to lock the reel against belt withdrawal rotation, the first and second ratchet wheels having equal numbers of ratchet teeth. In addition, the cam member and the first and second ratchet wheels are angularly related about the shaft, so that the first and second pawls simultaneously engage the bases of ratchet teeth on the first and second ratchet wheels respectively.

In the preferred form of the retractor, the shaft is journalled between the side walls of a U-shaped bracket which rockably supports a cross bar having a pair of first pawls which are proximate a pair of first ratchet wheels at opposite ends of the reel. The second ratchet wheel is internally toothed and surrounds the fly wheel and the second pawl which is pivotally mounted on the fly wheel. The means coupling the first pawl carrying cross bar and the second ratchet wheel, includes a transverse leg extending from the bar and engaged by an arm which includes a pin slideably engaging a radial slot in an end wall of the second ratchet wheel.

The improved retractor reel is rugged, simple, reliable, inexpensive and compact, and is simple and convenient to install even in restricted and limited spaces. The control components which require close tolerances may be injection molded of polymeric resin.

BRIEF DESCRIPTION OF THE DRAWINGS

FIG. 6' is a perspective view of a component thereof; and

DESCRIPTION OF THE PREFERRED EMBODIMENTS

Figure 1:
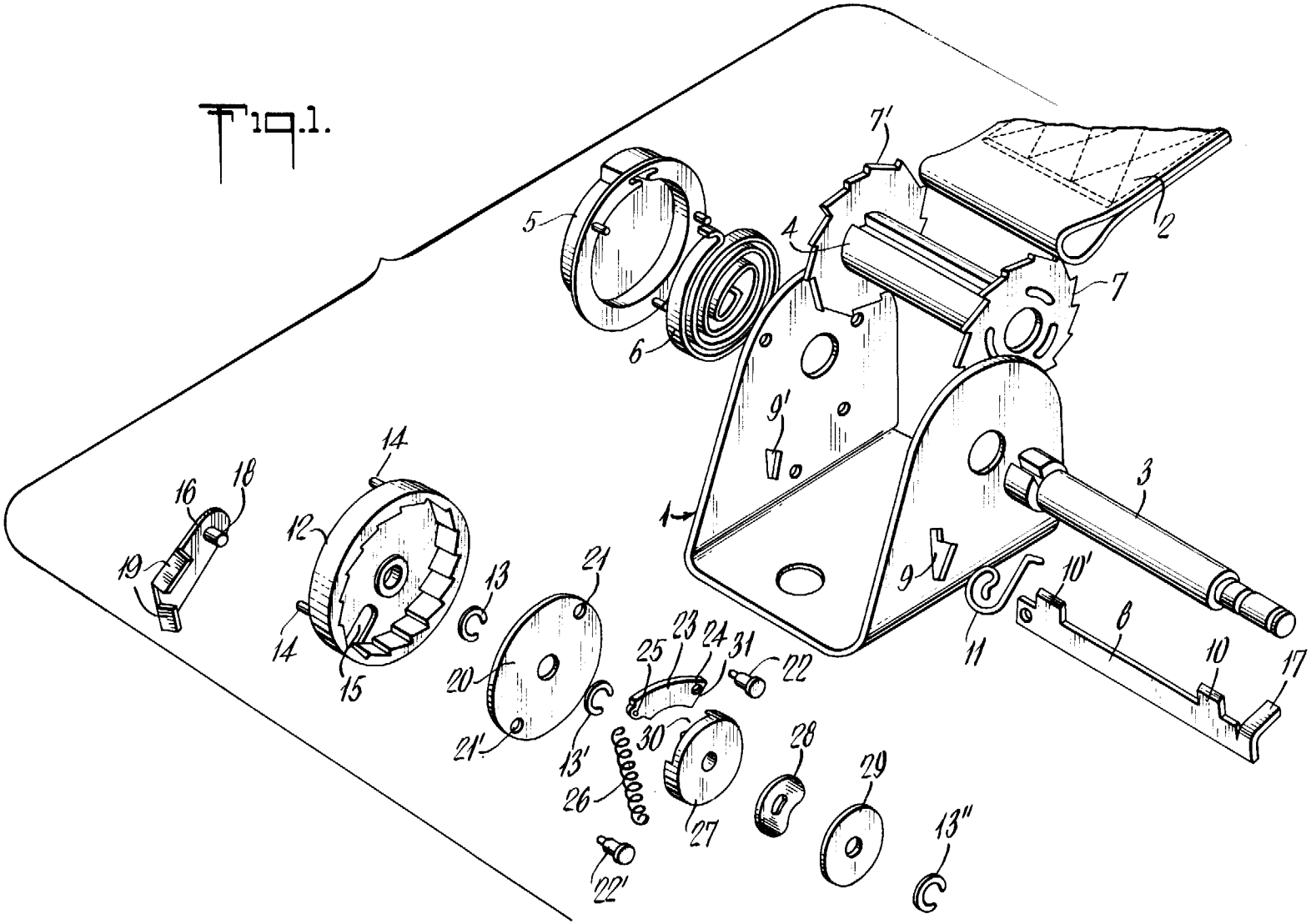
FIG. 1 is an exploded perspective view of an automatic locking belt retractor embodying the present invention.
Figure 2:
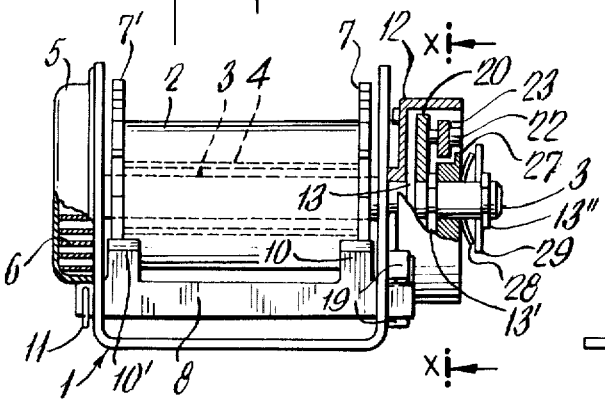
FIG. 2 is a fragmentary front elevational view thereof.
Figure 3:
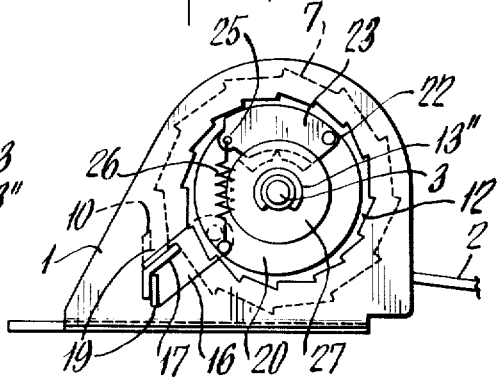
FIG. 3 is a side elevational view.
Figure 4:
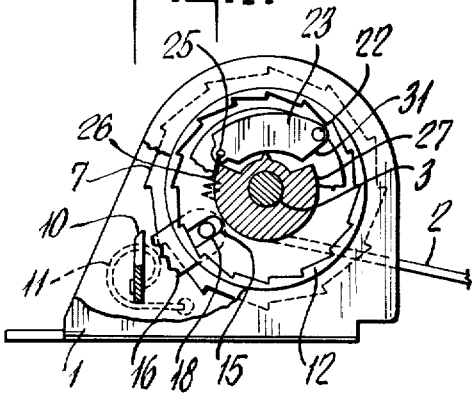
FIG. 4 is a sectional view taken along line X—X in FIG. 2, showing the retractor in its normal operating condition.

Referring now to the drawings, particularly FIGS. 1 to 5 thereof which illustrate a preferred embodiment of the present invention, the reference numeral 1 generally designates a U-shaped bracket or frame which constitutes the main support body of the retractor by which it is securely mounted to the floor or seat, or other suitable portion of the automotive vehicle. A shaft 3 having secured thereto reel 4 is rotatably mounted between the upright side walls of the frame 1, the reel 4 being attached, in turn, to one end of a safety belt 2. A cap-shaped return spring cover 5 and a helical return spring 6 are located on the outside face of a side wall of the U-shaped frame 1, the ends of return spring 6 being fastened to the cover 5 and the shaft 3 and operative to keep the safety belt 2 wound up on the reel 4 by its resilient recoiling force. Ratchet wheels 7,7' are fitted or otherwise secured to both ends of the reel 4 proximate the frame side walls.

A pawl member 8 is mounted in proximity to the ratchets 7,7' and includes a cross bar rockably engaging opposing segment shaped openings 9,9' formed in the side walls of the frame 1 and pawl teeth 10,10' projecting from the cross bar of the pawl member 8 and engageable with ratchet teeth 7,7'. A return spring 11 engages one end of the cross bar of the pawl member 8 and resiliently biases the pawl member 8 out of meshing engagement with the ratchet teeth 7,7' by the pawl teeth 10,10'. A cap-shaped ratchet latch wheel 12 made of a polymeric resin material and having the same number of internal ratchet teeth as those of each of the ratchet wheels 7,7' is mounted on the portion of shaft 3 projecting beyond the opposite side wall of the frame 1 and is rockable and restricted against axial movement by an E-shaped ring 13. The outer surface of the end wall of the latch wheel 12 has several bosses 14, by which the latch wheel 12 is rotatable with reduced friction on the confronting face of the side wall of the frame 1.

An elongated opening or slot 15 is formed in the end wall of the ratchet wheel 12 for coupling to a bent part or transverse tongue 17 on the pawl member 8 by engagement with an end pin 18 located on a pawl member actuating arm 16, to which the bent part 17 of the pawl member 8 is secured as by spot welding. Thus, the pawl member 8 is actuated by the rotation or rocking of the latch wheel 12. An inertia, *support* or fly wheel 20 made of metal is freely rotatably carried by shaft 3 inside of the latch wheel 12 and held by an E-shaped ring 13' against axial displacement on the shaft. The inertia wheel 20 has small holes 21,21', and a stepped pin 22' is suitably anchored in the hole 21' while another stepped pin 22 registers with a fulcrum opening 24 in a pawl 23 and is suitably anchored in the hole 21, the pawl 23 thus being lightly slideable on the surface of the inertia wheel 20. The free end part of the pawl 23 has a spring engaging aperture 25, by which a tension spring 26 connected to stepped pin 22 is retained. The pawl 23 is normally resiliently urged or biased by spring 26 towards a cam wheel 27, later to be described, and out of meshing engagement with the latch wheel 12. The cam wheel 27, an undulate ring spring 28 and a stopper plate 29 are fitted to the shaft 3 and retained thereon by the E-shaped ring 13''. The cam wheel 27 is made of a polymeric resin material and press fitted on the shaft 3. Segment shaped peripherally extending camming recesses 30 are formed in the surface of the cam wheel 27 facing to the inertia wheel 20.

As the inertia wheel 20 is rotated with rotation of cam wheel 27 but with a time lag, the camming recesses 30 act on the inwardly directed cam follower part 31 of the pawl 23, thereby rotating the pawl 23 outwardly and urging the pawl 23 into engagement with a ratchet tooth of the latch wheel 12. The cam wheel 27 is urged towards the inertia wheel 20 by the ring spring 28 backed by the stop plate 29 and constrained by the E-shaped ring 13'. The inertia wheel 20 has a light surface contact with the cam wheel 27 to keep the inertia wheel 20 from oscillation. The pawl 23 and the cam 30 are also uniformly maintained in their normal positions to prevent fluctuations in the sensitivity of the inertia system. In order to synchronize the operation of the ratchet wheels 7,7' with that of the latch wheel 12 under conditions of locking operation, the latch wheel 12 is turned partially counter-clockwise until the pawl teeth 10,10' of the pawl member 8 are in full meshing engagement with corresponding teeth of the ratchet wheels 7,7', that is, with the bases of the teeth, and the cam wheel 27 is then adjustably turned partially counter-clockwise until the pawl 23 is in complete engagement with the bottom or base of a tooth of the latch wheel 12. The cam wheel 27 is mounted fast on the shaft 3 in this position.

Figure 5:
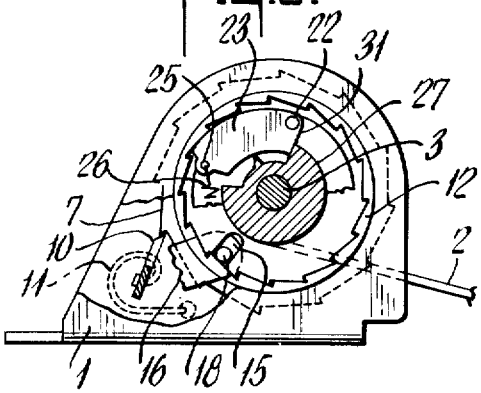
FIG. 5 is a view similar to FIG. 4, showing the retractor in its locked condition.

In operation, when the safety belt 2 is withdrawn at an ordinary or normal speed, the reel 4, shaft 3, E-shaped ring 13'', ring spring 28, stop plate 29, cam wheel 27, E-shaped ring 13' and inertia wheel 20 are simultaneously turned with the rotation of the shaft 3. The pawl 23 is pulled by the tension spring 26 and rotated in unison with the inertia wheel 20, as it is received in the camming recess 30 of the cam wheel 27. Thus, the latch wheel 12 is stationary and the pawl member 8 is held disengaged from the ratchets 7,7' under the influence of the spring 11. The safety belt 2 can then be withdrawn or retracted as desired with the body movement of the vehicle seat occupant. When a load higher than 0.3 G is suddenly applied to the safety belt 2 by the seat occupant's forward movement, in the case of some abnormal situation encountered by the automotive vehicle such as sharp deceleration, and the safety belt 2 is suddenly withdrawn, the cam wheel 27 starts its rapid rotation with the shaft 3. The inertia wheel 20 starts its rotation with the cam wheel 27, but with a certain time lag, because the inertia wheel 20 is fitted loosely on the shaft 3 and is made of metallic material and thus has considerable weight. Thus, the cam follower part 31 of the pawl 23 is pushed upwards by the face of the camming recess 30 of the cam wheel 27, as shown in FIG. 5. The pawl 23 is swung outwardly about opening 24 as a fulcrum and against the force of the spring 26, the free end part of the pawl 23 thus engaging the ratchet teeth of the latch wheel 12. The pawl 23 is rotated by the rotation of the cam wheel 27 thereby causing the turning of the latch wheel 12 to thereby swing the pawl teeth 10,10' of the pawl member 8 into engagement with the ratchet wheels 7,7' and thus bring the rotation of the reel 4 to a stop. In this locking process, when the pawl 23 is completely engaged with the ratchet teeth of the latch wheel 12 and the wheel 12 starts its rotation, the latch wheel 12 is synchronized with the ratchet wheels 7,7', so that the end parts of the pawl teeth 10,10' are kept in the position of the tooth tips of the ratchet wheels 7,7'. The latch wheel is thus rotated until the pawl teeth 10,10' are engaged completely with the tooth bottom regions of the ratchet wheels 7,7'. At this time, the ratchet wheels 7,7' are rotated simultaneously into complete meshing with the pawl teeth of the pawl member 8. With the ratchet wheels 7,7' thus engaged with the pawl teeth 10,10' the reel 4 is locked against belt withdrawal rotation to keep the safety belt 2 from further extraction, thereby restraining the occupant in his seat and promoting his safety.

Figure 6:
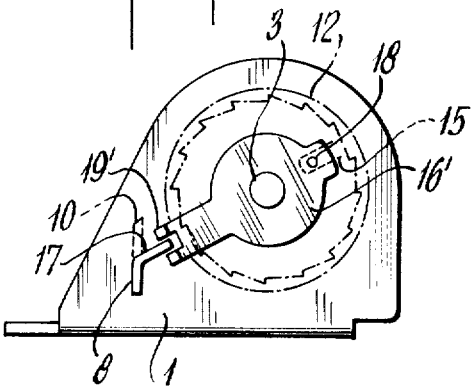
FIG. 6 is a side elevational view of another embodiment of the present invention.
Figure 7:
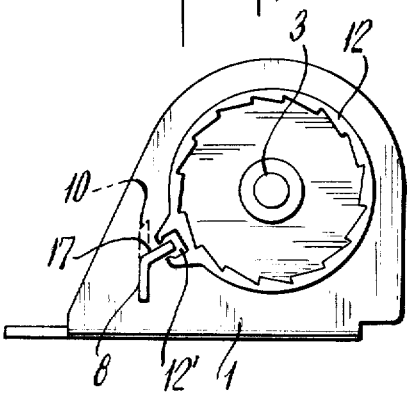
FIG. 7 is a side elevational view of a further embodiment.
Figure 6:
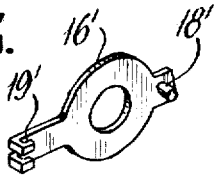

The embodiments of the present invention illustrated in FIGS. 6 to 7 of the drawings differ from that first described only in the manner of drive coupling the latch wheel 12 to the pawl member 8. Thus, in the embodiment shown in FIGS. 6 and 6', an acutating lever 16' is enlarged between its end and provided with an opening rotatably engaging the shaft 3 proximate the end wall of latch wheel 12. One end of the lever 16' terminates in a thickened yoke portion 19' which engages the tongue 17 projecting from the end of the cross bar of pawl member 8 and a pin 18' projects from the other end of lever 16' into sliding engagement with the slot 15 in the latch wheel end wall. In the embodiment illustrated in FIG. 7, a radial projection is integrally formed on the outside peripheral face of latch wheel 12 and has an enlarged radial recess 12' formed therein which slideably engages the tongue 17 on pawl member 8, so that rocking of the latch wheel 12 swings the pawl member 8. In operation, and in all other constructional details and relationships, the embodiments last described are similar to that first described.

The conventional emergency locking and winding mechanisms of the present type are usually provided with a complicated clutch mechanism to protect the sensor unit from excessive load application and prevent the incomplete locking at the time of operation. This results in the deficiencies and errors in sensitivity and in increased difficulty in producing a compact device. With the mechanism of the present invention, the device may be made highly compact due to omission of the complicated clutch mechanism as used in the conventional device. Moreover the various defects as encountered in the conventional apparatus at the time of emergency may be obviated without any reduction in the reliability of operation.

While there have been described and illustrated preferred embodiments of the present invention, it is apparent that numerous alterations, additions and omissions may be made without departing from the spirit thereof.

I claim:

1. An automatic locking safety belt retractor comprising a shaft, a take-up reel mounted on and rotatable with said shaft and spring biased to in a belt rewind direction, a safety belt connected to and retractable by and withdrawable from said reel, a first ratchet wheel rotatable with said reel, a first pawl mounted for movement between positions engaging and disengaging said first ratchet wheel, a second ratchet wheel mounted on and rotatable relative to said shaft, a fly wheel rotatably mounted on said shaft, a second pawl mounted on said fly wheel and movable therewith and movable relative to said fly wheel between positions engaging and disengaging said second ratchet wheel, a cam member mounted on and rotatable with said shaft and engagable with said second pawl whereby rotation of said cam member a predetermined angle in advance of said fly wheel by the rotation of said shaft in response to a predetermined pull on said belt effects the actuation of said second pawl by said cam member into engagement with said second ratchet wheel to forwardly rock said second ratchet wheel, and actuating means drive coupling said second ratchet wheel and said first pawl whereby forward rocking of said second ratchet wheel advances said first pawl into engagement with said first ratchet wheel to lock said reel against belt withdrawal rotation, said first and second ratchet wheels having equal numbers of ratchet teeth.

2. The retractor of claim 1 wherein said first and second ratchet wheels and said cam member are so angularly related that said first and second pawls when actuated to their engaged positions engage the base portions of corresponding ratchet teeth of the respective first and second ratchet wheels.

3. The retractor of claim 1, including a first spring resilient biasing said first pawl toward its ratchet disengage position and a second spring resiliently biasing said second pawl toward its ratchet disengage position.

4. The retractor of claim 3 comprising a mounting bracket including a pair of transversely spaced side walls, said shaft extending between and projecting beyond and journalled to said side walls, a pair of said first ratchet wheels disposed at opposite ends of said reel proximate the confronting faces of said bracket side walls, a transverse cross bar extending between and rockably supported by said bracket side walls proximate said first ratchet wheels, and a pair of said first pawls located on said cross bar and rockable between positions engaging and disengaging respective first ratchet wheels.

5. The retractor of claim 4 wherein said fly wheel, second ratchet wheel, said second pawl and said cam member are located on said shaft along the outside face of one of said bracket side walls.

6. The retractor of claim 4, wherein said second ratchet wheel is internally toothed and is cap shaped and provided with an end wall journalled on said shaft, and fly wheel and second pawl being disposed within the space delineated by said second ratchet wheel.

7. The retractor of claim 4, wherein said second ratchet wheel end wall has a radially extending slot formed therein, and said actuating means comprises a lever engaging and rockable with said cross bar and provided with a follower element remote from said cross bar slideably engaging said slot.

8. An emergency locking type vehicle safety belt retractor, comprising a U-shaped frame 1; a shaft mounted intermediate the upright sides of the U-shaped frame, said shaft loosely carrying on one outside of the frame, a cap-shaped latch wheel with internal teeth, an inertia wheel fitted with a pawl, a cam wheel press fitted on the shaft, a spring washer fitted on the shaft, and a stop plate also fitted on the shaft; ratchet wheels provided to both insides of the U-shaped frame and having the same number of teeth as those of the latch wheel; a belt-winding reel press fitted on the shaft; a pawl plate mounted intermediate the upright sides of the frame and in the proximity of the ratchet wheels; and a pawl plate actuating plate transversely extending from an end part of pawl plate; wherein, when the vehicle is subjected to an abrupt impact or sudden change in the operating state, said inertia wheel operates to rotate with the cam wheel, but with a time lag when the belt is suddenly extracted, the pawl on the inertia wheel thus engaging with the latch wheel to rotate the latter, thereby engaging the pawl plate with the ratchet wheels through the pawl plate actuating plate and preventing further reeling out of the safety belt; and wherein the number of teeth of the ratchet wheels is equal to that of the latch wheel to make the pivot angle of the ratchet wheels and that of the latch wheel equal to each other to synchronize the movement of the ratchet wheels with that of the pawl plate by adequate selection of the angle of operation of the latch wheel and the fulcrum distance of the pawl plate and the pawl plate actuating plate.

*9. An automatic locking safety belt retractor comprising a rotatable take-up reel spring biased in a belt rewind direction, a safety belt connected to and retractable by and withdrawable from said reel, a first ratchet wheel rotatable with said reel, a first pawl mounted for movement between positions engaging and disengaging said first ratchet wheel,*

*a second ratchet wheel coaxial with and rotatable relative to said first ratchet wheel, a second pawl rotatable with said first ratchet wheel and movable between positions engaging and disengaging said second ratchet wheel and normally urged to said ratchet wheel disengage position, actuating means for urging said second pawl into engagement with said second ratchet wheel, and means drive coupling said second ratchet wheel and said first pawl whereby rocking of said second ratchet wheel advances said first pawl into engagement with said first ratchet wheel to lock said reel against belt withdrawal rotation, said retractor being characterized by said first and second ratchet wheels having equal numbers of ratchet teeth.*

*10. The retractor of claim 9 wherein said actuating means includes means responsive to a predetermined rotational parameter of said reel for motivating said actuating means.*

*11. The retractor of claim 9 wherein said first and second ratchet wheels, said first and second pawls, said actuating means and said drive coupling means are so related that said first pawl when advanced to its ratchet wheel engage position engages the base portion of a tooth of the first ratchet wheel.*

*12. An automatic locking safety belt retractor comprising a shaft, a take-up reel mounted on and rotatable with said shaft and spring biased to rotate in a belt rewind direction, a safety belt connected to and retractable by and withdrawable from said reel, a first ratchet wheel rotatable with said reel, a first pawl mounted for movement between positions engaging and disengaging said first ratchet wheel, a second ratchet wheel mounted on and rotatable relative to said shaft, a support wheel mounted on said shaft, a second pawl mounted on said support wheel and means responsive and movable relative to said support wheel in response to a predetermined rotational parameter of said reel for moving said second pawl between positions engaging and disengaging said second ratchet wheel whereby a predetermined pull on said belt effects the actuation of said second pawl into engagement with said second ratchet wheel to forwardly rock said second ratchet wheel, and means drive coupling said second ratchet wheel and said first pawl whereby forward rocking of said second ratchet wheel advances said first pawl into engagement with said first ratchet wheel to lock said reel against belt withdrawal rotation, said first and second ratchet wheels having equal numbers of ratchet teeth.*

*13. The retractor of claim 12 wherein said first and second ratchet wheels, said first pawl, said second pawl moving means and said drive coupling means are so related that said first pawl when actuated to its engaged position engages the base portion of a tooth of the first ratchet wheel.*

*14. The retractor of claim 12 including a first spring resiliently biasing said first pawl toward its ratchet disengage position and a second spring resiliently biasing said second pawl toward its ratchet disengaging position.*

*15. The retractor of claim 14 comprising a mounting bracket including a pair of transversely spaced side walls, said shaft extending between and projecting beyond and journalled to said side walls, a pair of said first ratchet wheels disposed at opposite ends of said reel proximate the confronting faces of said bracket side walls, a transverse cross bar extending between and rockably supported by said bracket side walls proximate said first ratchet wheels, and a pair of said first pawls located on said cross bar and rockable between positions engaging and disengaging respective first ratchet wheels.*

*16. The retractor of claim 15 wherein said support wheel, second ratchet wheel, and said second pawl are located on said shaft along the outside face of one of said bracket side walls.*

*17. The retractor of claim 15, wherein said second ratchet wheel is internally toothed and is cap shaped and provided with an end wall journalled on said shaft, and said support wheel and second pawl being disposed within the space delineated by said second ratchet wheel.*

*18. The retractor of claim 15, wherein said second ratchet wheel end wall has a radially extending slot formed therein, and said actuating means comprises a lever engaging and rockable with said cross bar and provided with a follower element remote from said cross bar slideably engaging said slot.*

* * * * *